(12) United States Patent
Roth et al.

(10) Patent No.: US 6,994,108 B2
(45) Date of Patent: Feb. 7, 2006

(54) CHECK VALVE FOR FUEL PUMP

(75) Inventors: Robert A. Roth, Grand Blanc, MI (US); Partab Jeswani, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 187 days.

(21) Appl. No.: 10/379,288

(22) Filed: Mar. 4, 2003

(65) Prior Publication Data

US 2004/0173265 A1 Sep. 9, 2004

(51) Int. Cl.
*F16K 15/02* (2006.01)

(52) U.S. Cl. .................. 137/541; 137/542; 137/543.17; 251/359

(58) Field of Classification Search .................. 137/515, 137/515.5, 528, 540, 541, 543.17, 542, 454.2, 137/454.4, 454.5; 251/118, 359
See application file for complete search history.

(56) References Cited

U.S. PATENT DOCUMENTS

| 287,004 A | 10/1883 | Cullingworth |
| 774,340 A | 11/1904 | Smith |
| 1,759,081 A | 5/1930 | Anderson |
| 2,011,333 A | 8/1935 | Clifton |
| 2,080,760 A | 5/1937 | Condon |
| 2,206,356 A | 7/1940 | Hutchings |
| 2,285,997 A | 6/1942 | Mino |

(Continued)

FOREIGN PATENT DOCUMENTS

| DE | 100 36 939 | 2/2002 |
| FR | 1.088.616 | 3/1955 |
| JP | 2-78408 | 3/1990 |

OTHER PUBLICATIONS

Copy of European Search Report dated Aug. 4, 2004.

*Primary Examiner*—Ramesh Krishnamurthy
(74) *Attorney, Agent, or Firm*—Jimmy L. Funke

(57) ABSTRACT

A check valve for a fuel pump of a vehicle includes a valve housing adapted to be disposed in an outlet member of the fuel pump and a valve seat formed on the valve housing. The check valve also includes a valve member disposed in the valve housing and having a closed position to engage the valve seat to prevent fuel from flowing through the outlet member and an open position to allow fuel to flow through the outlet member. The valve housing has a vortex abating geometry located near the valve seat to add turbulence to fluid flow past the valve seat when the valve member is in the open position.

14 Claims, 2 Drawing Sheets

U.S. PATENT DOCUMENTS

| | | |
|---|---|---|
| 2,342,659 A | 2/1944 | Grove et al. |
| 2,367,106 A | 1/1945 | Dolch |
| 2,380,459 A | 7/1945 | Niesemann |
| 2,564,894 A | 8/1951 | Glasgow |
| 2,569,316 A | 9/1951 | Jerman |
| 2,599,898 A | 6/1952 | Dalrymple |
| 2,646,071 A | 7/1953 | Wagner |
| 2,752,933 A | 7/1956 | Olson |
| 2,809,660 A | 10/1957 | Becker |
| 2,842,150 A | 7/1958 | Olson |
| 2,884,952 A | 5/1959 | Mason et al. |
| 2,939,475 A | 7/1960 | Roach |
| 2,949,931 A | 8/1960 | Ruppright |
| 3,026,903 A | 3/1962 | Roach |
| 3,039,658 A | 6/1962 | Hoelle |
| 3,057,374 A | 10/1962 | Gondek |
| 3,125,119 A | 3/1964 | Richgels |
| 3,180,354 A | 4/1965 | Grose |
| 3,202,177 A | 8/1965 | Klein et al. |
| 3,234,959 A | 2/1966 | Feinberg |
| 3,272,218 A | 9/1966 | Johnson |
| 3,297,049 A | 1/1967 | Moskovitz |
| 3,425,444 A | 2/1969 | Jones |
| 3,443,579 A | 5/1969 | Doolittle |
| 3,485,441 A | 12/1969 | Eaton, Jr. |
| 3,756,273 A | 9/1973 | Hengesbach |
| 3,773,440 A | 11/1973 | Tateishi |
| 3,936,243 A | 2/1976 | Gakenholz |
| 3,937,250 A | 2/1976 | Golan et al. |
| 3,955,595 A | 5/1976 | Modes |
| 4,003,405 A | 1/1977 | Hayes et al. |
| 4,078,577 A | 3/1978 | Brown |
| 4,129,145 A | 12/1978 | Wynn |
| 4,149,559 A | 4/1979 | Wormser |
| 4,237,918 A | 12/1980 | German |
| 4,275,759 A | 6/1981 | Huang |
| 4,325,343 A | 4/1982 | Turner |
| 4,343,328 A | 8/1982 | Junger |
| 4,352,377 A | 10/1982 | Fritchman |
| 4,424,830 A | 1/1984 | Arnsperger et al. |
| 4,697,995 A | 10/1987 | Tuckey |
| 4,744,387 A | 5/1988 | Otteman |
| 4,756,281 A | 7/1988 | Chen et al. |
| 4,778,354 A | 10/1988 | Idei |
| 4,784,587 A | 11/1988 | Takei et al. |
| 4,799,930 A * | 1/1989 | Knoch et al. .............. 623/2.27 |
| 4,874,012 A | 10/1989 | Velie |
| 4,938,254 A | 7/1990 | Gimby |
| 4,964,391 A | 10/1990 | Hoover |
| 5,036,881 A | 8/1991 | Southmayd |
| 5,084,166 A | 1/1992 | Shiraga et al. |
| 5,130,014 A | 7/1992 | Volz |
| 5,320,136 A | 6/1994 | Morris et al. |
| 5,406,922 A | 4/1995 | Tuckey |
| 5,421,306 A | 6/1995 | Talaski |
| 5,513,395 A | 5/1996 | Chlebek et al. |
| 5,525,048 A | 6/1996 | Tuckey |
| 5,577,892 A | 11/1996 | Schittler et al. |
| 5,623,910 A | 4/1997 | Riggle |
| 5,665,229 A | 9/1997 | Fitzpatrick et al. |
| 5,727,529 A | 3/1998 | Tuckey |
| 5,728,292 A | 3/1998 | Hashimoto et al. |
| 5,785,025 A | 7/1998 | Yoshiume et al. |
| 5,799,688 A | 9/1998 | Yie |
| 5,918,852 A | 7/1999 | Otto |
| 6,070,605 A | 6/2000 | Steenburgh |
| 6,260,530 B1 | 7/2001 | Keon, Jr. |
| 6,341,623 B1 | 1/2002 | Channing |
| 6,401,749 B1 | 6/2002 | Tai et al. |
| 6,422,265 B1 | 7/2002 | Beyer et al. |
| 6,622,707 B2 | 9/2003 | Begley et al. |
| 6,622,708 B2 | 9/2003 | Braun et al. |
| 2003/0034073 A1 | 2/2003 | Roth |
| 2003/0037823 A1 | 2/2003 | Pickelman |

* cited by examiner

CHECK VALVE FOR FUEL PUMP

TECHNICAL FIELD

The present invention relates generally to fuel pumps for vehicles and, more particularly, to a check valve for a fuel pump of a vehicle.

BACKGROUND OF THE INVENTION

It is known to provide a fuel tank in a vehicle to hold fuel to be used by an engine of the vehicle. It is also known to provide a fuel pump inside the fuel tank to pump fuel to the engine. Typically, the fuel pump includes a check valve to allow fuel to exit the fuel pump. Generally, a forward flow check valve consists of a checking or valve device, typically a plunger, such as a pintel having a seal, and a seat that when in contact form a leak proof seal. The pintel and seal are forced against the seat with a spring that provides the proper force to maintain pintel and seal to seat contact during no flow and low-pressure forward flow conditions. In automotive fuel pump applications, this force prevents flow from exiting the fuel tank when the vehicle fuel line is removed or severed.

Check valves in general, whether bullet nose, ball, or pintle and seal type, tend to be unstable in a fluid flow stream due to vortex shedding and eddy currents. This vortex shedding causes instability and oscillations of the checking or valve device, which in turn causes undesirable noise. The check valve of the pintle and seal type has a lower cost than other types of check valves, but is less aerodynamic than these other types of check valves. This makes it less stable in the flow stream and more likely to oscillate. It is also more difficult to contour the flow path downstream of the pintel and seal (because the return spring/retention features are upstream of the seat) to take advantage of an aerodynamic shape in eliminating oscillations.

Therefore, it is desirable to provide a check valve in a fuel pump for a vehicle that is more stable in a fluid flow stream. It is also desirable to provide a check valve for a fuel pump that eliminates oscillation of the pintel and reduces noise. It is further desirable to provide a check valve for a fuel pump at a relatively low cost. Therefore, there is a need in the art for a check valve that meets these desires.

SUMMARY OF THE INVENTION

Accordingly, the present invention is a check valve for a fuel pump of a vehicle including a valve housing adapted to be disposed in an outlet member of the fuel pump. The check valve also includes a valve seat formed on the valve housing. The check valve includes a valve member disposed in the valve housing and cooperating with the valve seat. The valve member has a closed position to engage the valve seat to prevent fuel from flowing through the outlet member and an open position to allow fuel to flow through the outlet member. The valve housing has a vortex abating geometry located near the valve seat to add turbulence to fluid flow past the valve seat when the valve member is in the open position.

One advantage of the present invention is that a new check valve is provided for a fuel pump of a vehicle. Another advantage of the present invention is that the check valve has a seat made "rough", using specifically shaped geometry. Yet another advantage of the present invention is that the check valve has a diameter that changes abruptly, allowing turbulence to build, which in turn stops the formation of vortices. Still another advantage of the present invention is that the check valve, in the absence of vortices, remains stable, and the valve member does not oscillate. A further advantage of the present invention is that the check valve has reduced noise generation due to elimination of pintel oscillations. Yet a further advantage of the present invention is that the check valve has a low cost design.

Other features and advantages of the present invention will be readily appreciated, as the same becomes better understood, after reading the subsequent description taken in conjunction with the accompanying drawings.

DESCRIPTION OF THE PREFERRED EMBODIMENT

Figure 1:
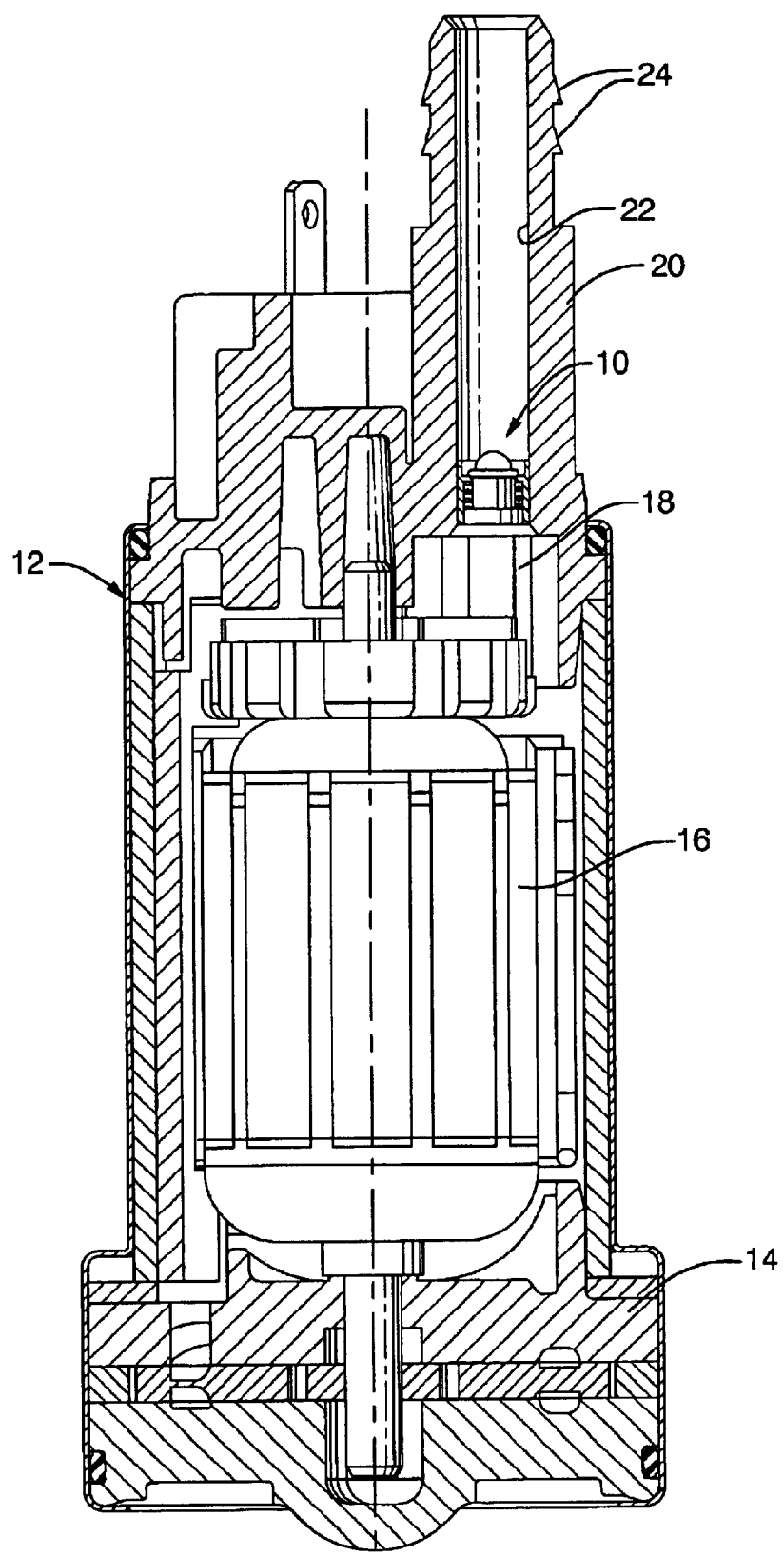
FIG. 1 is a fragmentary elevational view of a check valve, according to the present invention, illustrated in operational relationship with a fuel pump.

Referring to the drawings and in particular FIGS. 1 through 4, one embodiment of a check valve 10, according to the present invention, is shown for a fuel pump, generally indicated at 12, of a vehicle (not shown). The fuel pump 12 includes a pump section 14 at one axial end, a motor section 16 adjacent the pump section 14, and an outlet section 18 adjacent the motor section 16 at the other axial end. As known in the art, fuel enters the pump section 14, which is rotated by the motor section 16, and is pumped past the motor section 16 to the outlet section 18. The outlet section 18 has an outlet member 20 extending axially with a passageway 22 extending axially therethrough. The outlet member 20 also has a plurality of projections or barbs 24 extending radially outwardly for attachment to a conduit (not shown). The outlet member 20 also receives the check valve 10 to be described in the passageway 22. It should be appreciated that the fuel flowing to the outlet section 18 flows into the outlet member 20 and through the passageway 22 and the check valve 10 when open to the conduit. It should also be appreciated that, except for the check valve 10, the fuel pump 12 is conventional and known in the art.

Referring to FIGS. 1 through 4, the check valve 10 includes a valve housing 26 extending axially and disposed in the passageway 22 of the outlet member 20. The valve housing 26 has a body portion 28 that is generally tubular in shape and has a generally circular cross-sectional shape. The body portion 28 extends axially and has a passageway 30 extending axially therethrough with an enlarged portion 32 at one end. The body portion 28 also has a flow tube 34 extending axially at the other end thereof for a function to be described. The valve housing 26 is made of a rigid material such as metal or plastic, preferably brass. It should also be appreciated that the valve housing 26 is a monolithic structure being integral, unitary, and one-piece.

The check valve 10 also includes a valve seat 36 disposed adjacent the passageway 30 and formed on the valve housing 26 adjacent the flow tube 34 of the valve housing 26. The valve seat 36 has a generally frusta-conical cross-sectional shape for a function to be described. The valve seat 36 is made of a rigid material such as metal or plastic, preferably brass. It should be appreciated that the valve seat 36 and valve housing 26 are a monolithic structure being integral, unitary, and one-piece.

The check valve 10 includes a valve member 38 disposed in the valve housing 26 and cooperating therewith. The valve member 38 is of a pintel type and extends axially. The valve member 38 has a hub 40. The hub 40 has a generally hemi-spherical shape. The hub 40 also has an annular groove 42 for a function to be described. The valve member 38 has a stem 44 extending axially from the hub 40. The stem 44 is generally cylindrical with a generally circular cross-sectional shape. The stem 44 is disposed in the passageway 30 of the valve housing 26 for sliding movement therein. The stem 44 has a length greater than a diameter thereof. The valve member 38 has a flange 46 extending radially from the stem 44 at one end and disposed annularly thereabout for a function to be described. The valve member 38 is made of a rigid material such as plastic. The hub 40 of the valve member 38 travels within the flow tube 34 of the valve housing 26 and the flange 46 travels within the enlarged portion 32 of the valve housing 26. It should be appreciated that the flow tube 34 provides a constant annular flow area between an outside diameter of a seal 50 to be described and an inside diameter of the flow tube 34.

The check valve 10 further includes a vortex abating geometry or device 48 in the area near the valve seat 36. In the embodiment illustrated, the vortex abating geometry 48 is an annular and generally "V" shaped groove extending axially into the valve housing 26 and spaced radially between the flow tube 34 and the valve seat 36. In another embodiment, the vortex abating geometry 48 is an annular and generally rectangular shaped groove extending axially into the valve housing 26 and spaced radially between the flow tube 34 and the valve seat 36. The vortex abating geometry 48 adds turbulence to the fluid flow stream between the seal 50 and the seat 36 of the valve housing 26, which disrupts any vortices which have been created in the fluid flow stream. It should be appreciated that the valve seat 36 has a surface that is smooth where the seal 50 comes into contact with it to maintain a good seal when the seal 50 is seated. It should also be appreciated that the vortex abating geometry 48 may be any suitable shaped annular groove extending axially into the valve housing 26.

As the valve member 38 moves away from the sealing area of the valve seat 36, the valve seat 36 is made "rough" using the vortex abating geometry 48 and its diameter changes abruptly by a rapid diameter expansion between the valve seat 36 and the flow tube 34. The sudden expansion of the flow area and rough surface of the vortex abating geometry 48 causes turbulence to build, which in turn stops the formation of vortices. It should be appreciated that these vortices cause the valve member 38 to oscillate as the pressure changes from high to low around the valve member 38. It should also be appreciated that, in the absence of vortices, the flow field remains stable and the valve member 38 does not oscillate.

Figure 2:
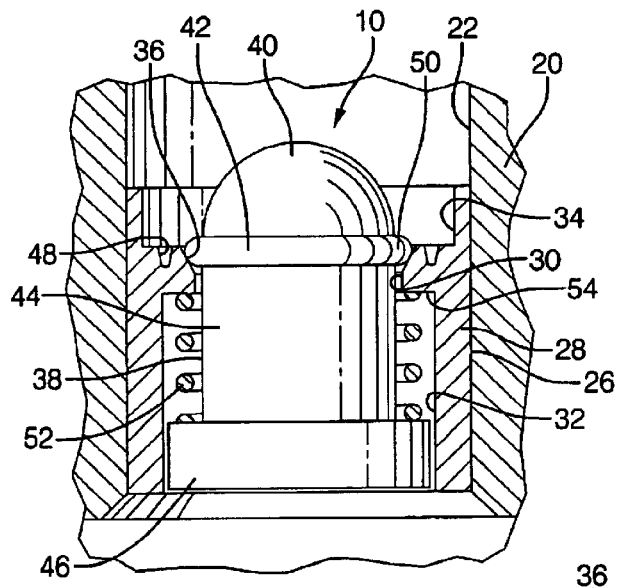
FIG. 2 is an enlarged fragmentary elevational view of the check valve of FIG. 1 illustrating a closed position.
Figure 3:
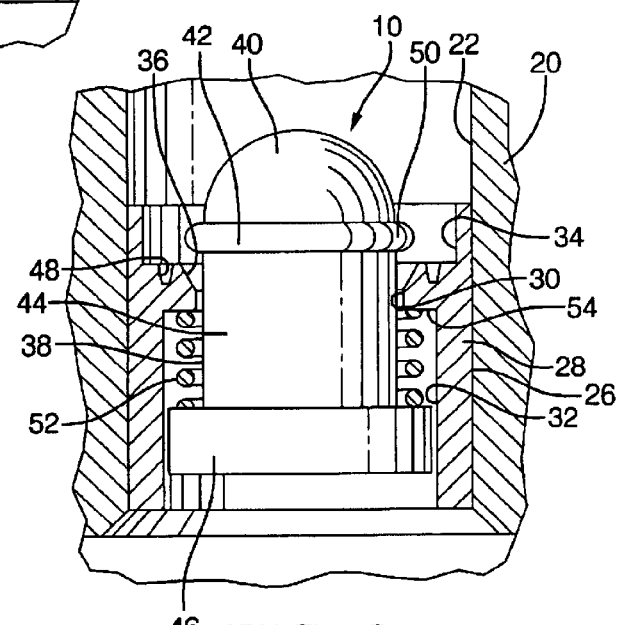
FIG. 3 is a view similar to FIG. 2 illustrating the check valve in an open position.
Figure 4:
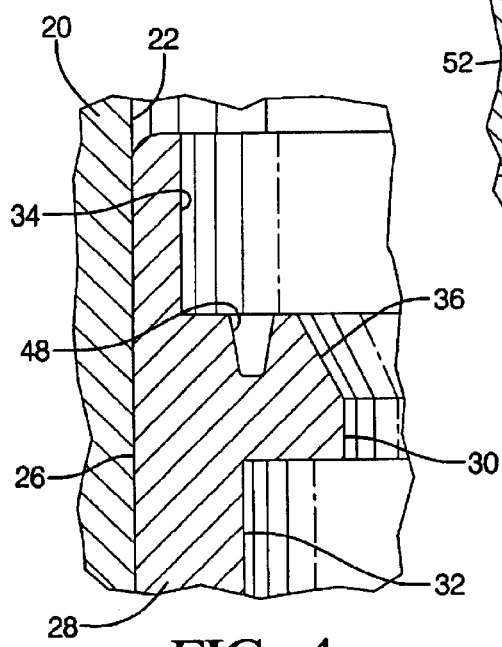
FIG. 4 is an enlarged fragmentary elevational view of a portion of the check valve of FIG. 1.

The check valve 10 includes a seal 50 disposed in the groove 42 of the valve member 38 to engage the valve seat 36 when the valve member 38 is in a closed position. The seal 50 is of an o-ring type and made of an elastomeric material. The valve member 38 has a first or closed position with the seal 50 cooperating with the valve seat 36 to close the passageway 30 of the valve housing 26 as illustrated in FIG. 2. The valve member 38 has a second or open position cooperating with the valve housing 26 to open the passageway 30 of the valve housing 26 as illustrated in FIG. 3. It should be appreciated that the stem 44 of the valve member 38 has a close fit to the passageway 30 of the valve housing 26.

The check valve 10 further includes a spring 52 to urge the valve member 38 and seal 50 toward the valve seat 36. The spring 52 is of a coil type. The spring 52 is disposed about the stem 44 of the valve member 38 between the flange 46 and a surface 54 of the enlarged portion 32 of the passageway 30 of the body portion 28 of the valve housing 26. It should be appreciated that the spring 52 urges the valve member 38 and seal 50 to engage the valve seat 36 in a closed position. It should also be appreciated that the spring 52 is conventional and known in the art.

In operation, the check valve 10 is in an assembled state in which the valve housing 26 is disposed in the passageway 22 of the outlet member 20 of the fuel pump 12. The seal 50 engages the valve seat 36 and the valve member 38 is in the closed position as illustrated in FIG. 2. The seal 50 is contained on the valve seat 36 and the valve member 38 is maintained in the closed position by the spring force of the spring 52.

During high forward flow conditions, the valve member 38 is dislodged from the closed position and travels in the flow direction away from the valve seat 36. Fuel enters the outlet member 20 when the fuel is pumped by the pump section 14 past the motor section 16 to the outlet section 18. In normal operating conditions where the output of the fuel pump 12 is greater than 20 kPa. to the check valve 10, fuel flows to the valve member 38 and causes the valve member 38 to move away from the valve seat 36 as illustrated in FIG. 3. The valve member 38 moves to an open position, which is the maximum position desired off of the valve seat 36. In the open position, the valve member 38 allows fuel to flow around the hub 40 of the valve member 38 and past the flow tube 34 of the valve housing 26. Fuel flows from the check valve 10 through the passageway 22 of the outlet member 20 to the conduit. In the open position, the valve member 38 is contained and retained in the center of the fuel flow stream by the flow tube 34. The rapid diameter expansion between the valve seat 36 and the flow tube 34 causes sudden expansion of the flow area and rough surface of the vortex abating geometry 48 causes turbulence to build, which in turn stops the formation of vortices. As a result, the valve member 38 does not oscillate and thus noise is reduced.

At low flow conditions, the position of the valve member 38 is determined by the spring rate of the spring 52 and distance of the valve member 38 and seal 50 off of the valve seat 36. Once again, the sudden expansion of the flow area and rough surface of the vortex abating geometry 48 causes turbulence to build, which in turn stops the formation of vortices. As a result, the valve member 38 does not oscillate and thus noise is reduced. It should be appreciated that, although the check valve 10 is illustrated as a pintle and seal type, the check valve 10 may be of another type such as a bullet nose or ball valve. It should also be appreciated that it is desirable to use a check valve 10 of the pintle and seal type due to its low cost, and in this embodiment, the vortex abating geometry 48 in the valve housing 26.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A check valve for a fuel pump of a vehicle comprising:
a valve housing adapted to be disposed in an outlet member of the fuel pump, said value housing defining a passageway having an inlet and an outlet;

a valve seat formed on said valve housing and having a fluid flow outlet side;

a valve member disposed in said valve housing and having a closed position to engage said valve seat to prevent fuel from flowing through the outlet member and an open position to allow fuel to flow through the outlet member, said value member having a hub adjacent the value seat and a stem extending from said hub toward the inlet to the passageway; and said valve housing including a groove having a vortex abating geometry located about said valve seat on said fluid flow outlet side to add turbulence to fluid flow past said valve seat when said valve member is in said open position.

2. A check valve as set forth in claim 1 wherein said vortex abating geometry is spaced radially from said valve seat.

3. A check valve as set forth in claim 2 wherein said vortex abating geometry extends axially into said valve housing.

4. A check valve as set forth in claim 1 wherein the passageway includes a flow tube at said outlet of said valve housing adjacent said valve seat.

5. A check valve as set forth in claim 1 wherein said valve housing has an enlarged opening at said inlet to said passageway.

6. A check valve as set forth in claim 5 wherein said valve member has a flange at one end of said stem opposite said hub and disposed in said enlarged opening.

7. A check valve as set forth in claim 1 wherein said hub has an annular groove extending radially therein.

8. A check valve as set forth in claim 7 including a seal disposed in said groove for contacting said valve seat when said valve member is in said closed position.

9. A check valve as set forth in claim 8 including a spring disposed about said valve member to urge said seal and said valve member toward said valve seat.

10. A check valve for a fuel pump of a vehicle comprising:

a valve housing adapted to be disposed in an outlet member of the fuel pump, said valve housing having a passageway extending axially therethrough and comprising an inlet and an outlet;

a valve seat formed on said valve housing adjacent said passageway and having a fluid flow outlet side;

a valve member disposed in said passageway of said valve housing and having a closed position to engage said valve seat to prevent fuel from flowing through the outlet member and an open position to allow fuel to flow through the outlet member, said value member comprising a hub, a seal received in a groove in the hub for contacting the valve seat when said valve member is in the closed position, and a stem extending from the hub toward the inlet of the passageway a coil spring disposed about the stem for biasing the valve member in the closed position; and said valve housing including a groove having a vortex abating geometry spaced radially about said valve seat on said fluid flow outlet side to add turbulence to fluid flow past said valve seat when said valve member is in said open position.

11. A check valve as set forth in claim 10 including a flow tube at one end of said valve housing adjacent said valve seat.

12. A check valve as set forth in claim 10 wherein said valve housing has an enlarged opening at one end of said passageway and said valve member has a flange at one end and disposed in said enlarged opening.

13. A check valve as set forth in claim 12 wherein said spring is disposed between said flange and said valve seat to urge said valve member toward said valve seat.

14. A fuel pump comprising:

a pump section at one axial end;

a motor section adjacent said pump section;

an outlet section adjacent said motor section at the other axial end, said outlet section including an outlet member having a first passageway extending therethrough;

a valve housing disposed in said first passageway of said outlet member, said valve housing having a body portion with a second passageway extending axially therethrough, said passageway having an inlet and an outlet;

a valve seat formed on said valve housing adjacent said second passageway and having a fluid flow outlet side;

a valve member disposed in said second passageway of said valve housing and having a closed position to engage said valve seat to prevent fuel from flowing through said outlet member and an open position to allow fuel to flow through said outlet member;

said valve member comprising a hub having an annular groove extending radially therein and a stem extending from said hub toward the inlet to the second passageway;

a seal disposed in said groove for contacting said valve seat when said valve member is in said closed position;

said valve housing having an enlarged opening at one end of said second passageway and said hub comprising a flange at one end and disposed in said enlarged opening;

a spring disposed about said valve stem between said flange and said valve seat to urge said seal and valve member toward said valve seat; and said valve housing including a groove having a vortex abating geometry spaced radially about said valve seat on said fluid flow outlet side to add turbulence to fluid flow past said valve seat when said valve member is in said open position.

* * * * *